Nov. 18, 1969  P. A. DE GRAAF  3,479,005

FUELING NOZZLE STRUCTURE

Filed July 22, 1966  2 Sheets-Sheet 1

INVENTOR
PAUL ANDRE deGRAAF

BY
Mason, Porter, Diller & Brown
ATTORNEYS

Nov. 18, 1969  P. A. DE GRAAF  3,479,005
FUELING NOZZLE STRUCTURE
Filed July 22, 1966  2 Sheets-Sheet 2
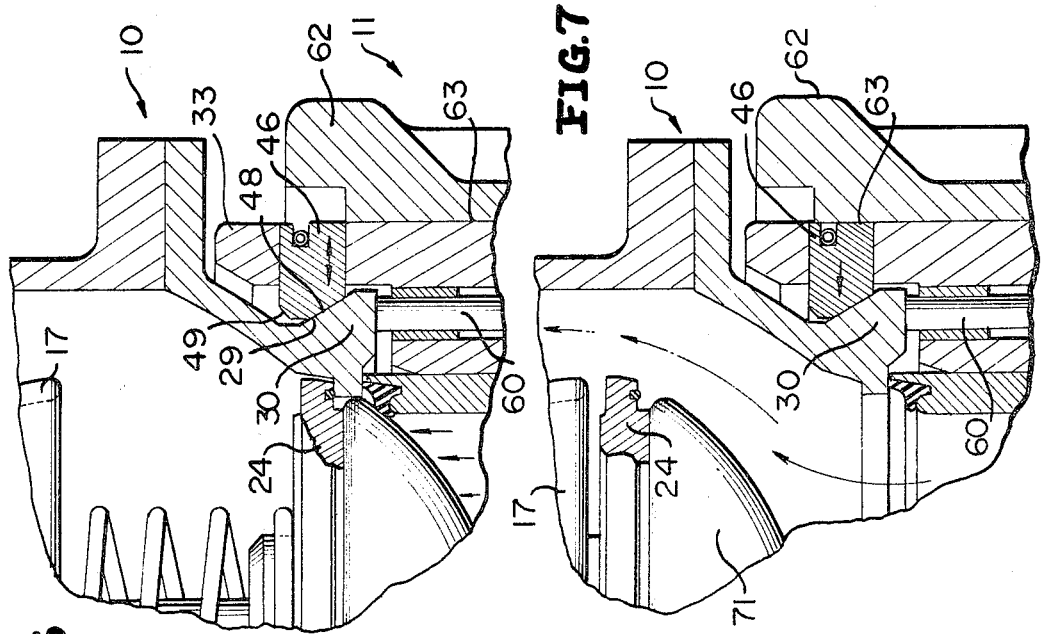
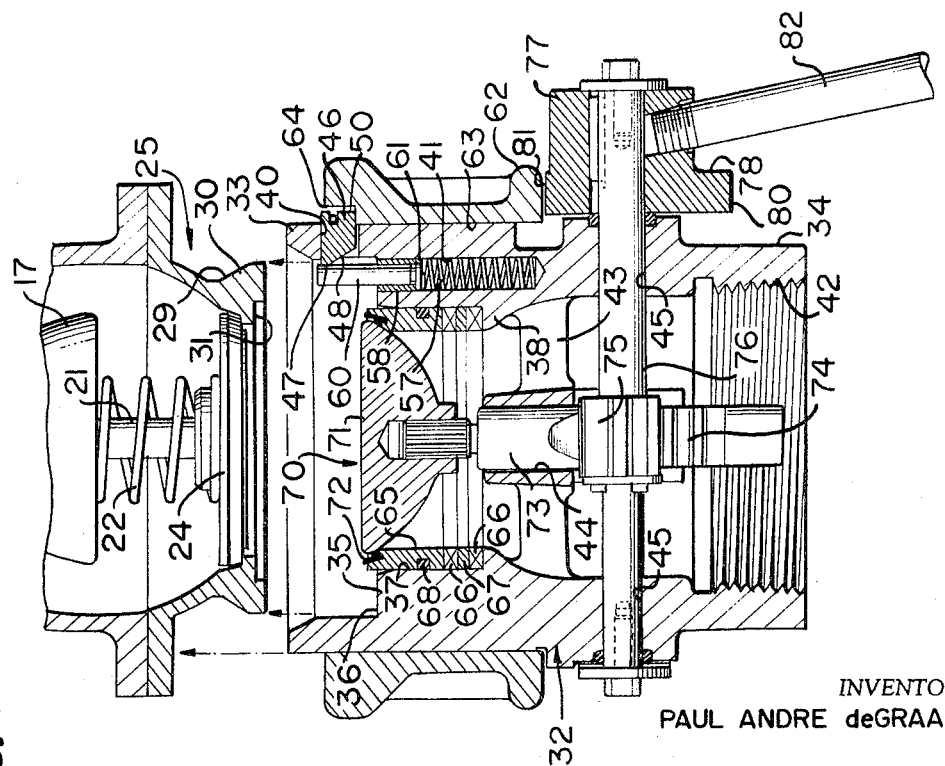
INVENTOR
PAUL ANDRE deGRAAF
BY
Mason, Porter, Diller & Brown
ATTORNEY

United States Patent Office 3,479,005
Patented Nov. 18, 1969

3,479,005
FUELING NOZZLE STRUCTURE
Paul A. de Graaf, Los Angeles, Calif., assignor to Parker-Hannifin Corporation, Cleveland, Ohio, a corporation of Ohio
Filed July 22, 1966, Ser. No. 567,225
Int. Cl. F16l 29/00, 37/28; F16k 31/50
U.S. Cl. 251—149.9    16 Claims

ABSTRACT OF THE DISCLOSURE

This disclosure relates to means for securely interlocking nozzles to adaptors whereby accidental disengaging of nozzles from adaptors is precluded during fuel flow through the nozzles. The nozzle includes latching means carried in a normally unlatched position and being movable to an operative engaging position with an adaptor neck member. The nozzle further includes a single means for controlling the flow of fluid through the assembly and also for moving a locking means into a locking position with the latching means, the single means functioning to lock the latching means before permitting flow of fluid through the assembly.

---

This application relates in general to new and useful improvements in nozzle adaptor and nozzle connection assemblies, and in particular to new and useful means for securely interlocking nozzles to adaptors whereby accidental disengaging of nozzles from adaptors is precluded during fuel flow through the nozzles.

In providing nozzles which may quickly and readily be connected to adaptors, as for example, to aircraft tank adaptors, in order to permit rapid fueling of aircraft tanks, it is desirable to have nozzles which may be rapidly connected to adaptors, but it is essential to provide nozzles, which when attached to the adaptors, will be securely affixed thereto, in order that accidental disconnection of a nozzle from its adaptor is precluded, particularly during the flow of fuel through the nozzle.

Prior art devices generally utilize nozzle and adaptor connections of the "bayonet" type, wherein one of the mating pieces is provided with an annular ridge, which is broken by one or more slots, which slots are adapted to engage corresponding lugs disposed about the periphery of a mating piece, during movement of mating pieces together. The lug of one piece would travel through the slot of the mating piece, into an annular groove of the other piece, and upon relative rotation of the pieces, would move the lugs and slots out of registration with one another, whereupon separation of the mating pieces is prevented by engagement of mechanical stops upon opening of the flow handle.

Such prior art devices are particularly undesirable from an assembly standpoint, in that, when connecting nozzle elements to adaptor elements, it is first necessary to align lugs of one of the elements with spaced slots in another of the elements. Such a procedure is extremely difficult and cumbersome, particularly when used with nozzles of substantially large diameters.

Another disadvantage of prior art devices is that it is usually necessary to rotate a nozzle element with respect to an adaptor element while holding lugs of one of the elements in registered alignment with slots of the other of the elements, a procedure which is also cumbersome, due to the substantial weight of many nozzle connection assemblies, particularly should an attached nozzle line be filled with fuel. In rotating the nozzle connection onto an adaptor, the mechanic often experienced substantial difficulty in overcoming the forces of sliding friction and inherent resistance of an attached nozzle connection fuel line to the necessary rotation or twisting motion required to engage the lugs into the grooves.

Accordingly, the present invention seeks to overcome each of the above prior art fueling difficulties by providing a nozzle and adaptor combination whereby the nozzle may be attached to the adaptor upon contact therewith, without requiring relative rotation between the nozzle and adaptor, and whereby a valve in the nozzle line is prevented from opening and permitting the passage of fuel thereby whenever the nozzle and adaptor elements are not securely interlocked against disengagement.

It is therefore a primary object of this invention to provide a nozzle connection assembly comprising a latching means carried by a nozzle, which latching means is retained in an unlatched position by associated retaining means, and which retaining means are operable upon contact with an associated adaptor to disengage the latching means thereby permitting the latching means to engage the adaptor.

It is another object of this invention to provide a novel nozzle assembly and adaptor assembly connection comprising latching elements carried by the nozzle assembly for engaging an associated portion of the adaptor assembly, which latching elements are moved from an unlatched to a latched position by contact of a portion of the adaptor assembly with nozzle element retaining means, which retaining means are movable upon contact by the adaptor portion to permit engagement of the adaptor portion by the retaining elements, and wherein means are provided for securely locking the latching means in an operative engaging position with associated adaptor portions.

It is a further object of the present invention to provide a nozzle assembly having adaptor latching means operable to engage an associated adaptor portion upon contact between a nozzle assembly and adaptor assembly, wherein means are provided for locking the latching elements in an engaging position with adaptor portions whereas not until after the latching means are securely locked is a plug valve within the nozzle assembly permitted to open.

It is a further object of the present invention to provide a novel nozzle assembly having latching elements therewith for engagement with an associated adaptor assembly, and to provide a latching means locking mechanism which is operable upon operation of a manually controllable valve plug, whereby fluid flow past a nozzle valve plug is prevented whenever the latching means is not securely locked in position by the locking means, and to prevent unlocking of the latching means during fluid flow through the nozzle.

It is a further object of this invention to provide a novel nozzle assembly and adaptor assembly combination, wherein a secure latching is effected between latching elements on the nozzle assembly and an annular rim of the adaptor assembly without regard to relative radial orientation of the assemblies, and wherein the latching elements may be securely locked in interlocking engagement with the adaptor rim in such a way as to prevent disengagement of the assemblies during fluid flow through the nozzle assembly.

It is yet another object of this invention to provide a novel series of spring biased latching elements for a nozzle assembly, which latching elements are retained in an unlatched position by associated spring biased retaining pins, which pins are retracted upon contact with an associated portion of an adaptor assembly, which is engaged by the latching elements.

With the above, and other objects in view that will hereinafter appear, the nature of the invention will be more clearly understood by reference to the following description, the appended claims, and the several views illustrated in the accompanying drawings.

3

In the drawings:

FIGURE 4 is a fragmentary vertical sectional view of an adaptor assembly and nozzle assembly of this invention, wherein there is illustrated latching, latch retaining, locking and fluid flow controlling mechanisms of this invention.

FIGURE 6 is an enlarged fragmentary vertical sectional view of the interconnected adaptor assembly and nozzle assembly of this invention, with the latching elements of this invention in their operative position and with the plug assembly of this invention in its closed position.

FIGURE 7 is an enlarged fragmentary vertical sectional view of the interconnected adaptor assembly and nozzle assembly of this invention, with the latching elements of the nozzle assembly in interlocked engagement with a rim of the adaptor assembly, with the locking ring positioned outwardly of the latching elements to prevent outward movement of such elements to an unlatched position, and with the plug assembly of this invention in an open position for permitting the flow of fluid through the nozzle and adaptor assemblies.

Figure 1:
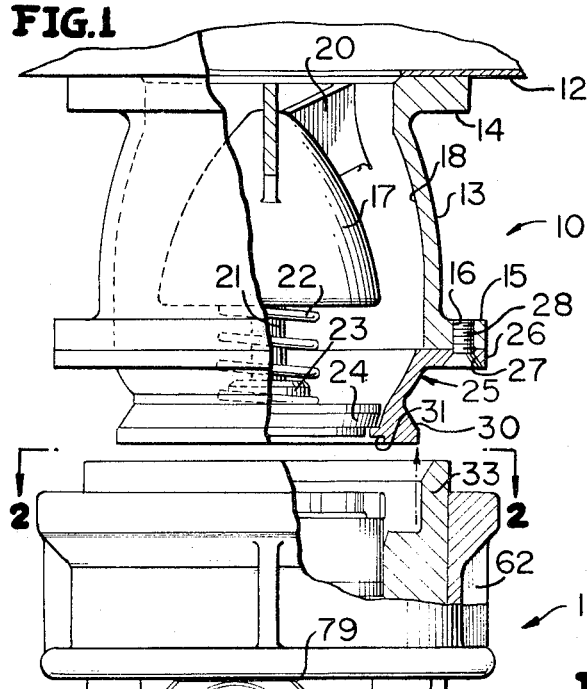
FIGURE 1 is an elevational view, partly in section, of an adaptor assembly and a nozzle assembly of this invention, and illustrates the adaptor assembly attached to a fuel tank and a nozzle assembly adapted for movement in the direction of the arrow of FIGURE 1 into engagement with the adaptor assembly.
Figure 5:
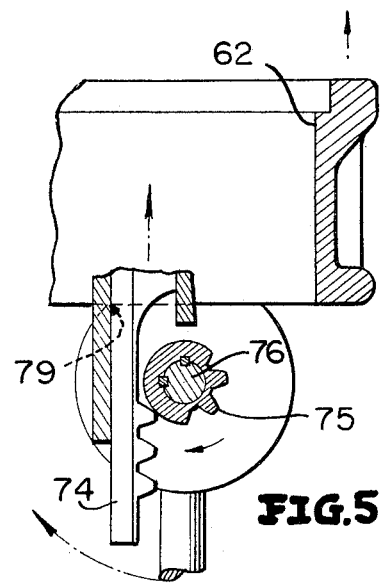
FIGURE 5 is a diagrammatic elevational view of a rack and gear assembly of this invention, and its operative relation with a locking ring of this invention.
Figure 2:
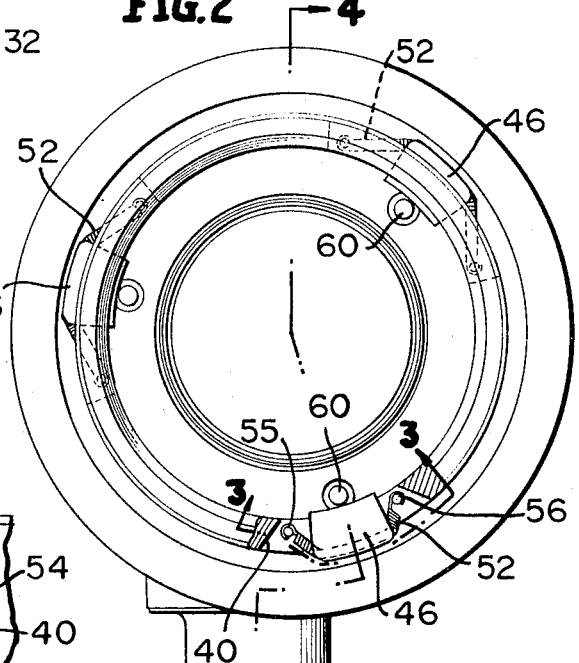
FIGURE 2 is a plan view of the novel assembly of this invention, taken along the line 2—2 of FIGURE 1 and illustrates details of attachment of spring retracted latching elements of this invention to a nozzle of this invention.
Figure 3:
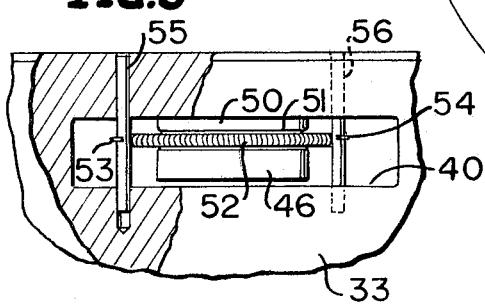
FIGURE 3 is a fragmentary side elevational view, illustrated partly in section, taken along the line 3—3 of FIGURE 2, and illustrates in greater detail the operative components of the latching elements of this invention.

Referring now to the drawings in detail, reference is first made to FIGURE 1 wherein there is illustrated an adaptor assembly generally designated by the numeral 10, a nozzle assembly generally designated by the numeral 11, and a fuel tank 12.

The adaptor assembly 10 includes a generally cylindrical but slightly ovular adaptor body 13 having an upper annular flange 14 adapted for attachment to the fuel tank 12 by means of bolts (not shown) or the like. The body 13 also includes a lower annular flange 15 having attachment bolt holes 16 spaced about the periphery thereof. The body 13 also carries a conically shaped flow diverter 17, inwardly thereof, and attached to inner walls 18 of the body 13 by integral webs 20.

The flow diverter 17 carries a shaft 21 extending from a lower end thereof, and about which is positioned a compression spring 22. The spring 22 is in compressive engagement at an upper end thereof, inwardly of the flow diverter 17 (not shown) and is seated on a boss 23 of a disc-like poppet valve 24. The shaft 21 is firmly seated in the boss 23 of the poppet valve 24 and is slidingly movable relative to a central bore (not shown) of the flow diverter 17, whereby the poppet valve 24 is adapted to be moved longitudinally into a position adjacent the bottom of the flow diverter 17, as is illustrated in FIGURE 7.

The adaptor body 13 also carries a connector base 25, having an annular flange 26 thereon with a series of peripherally spaced bolt holes 27. Flange 15 of adaptor body 13 and flange 26 of connector base 25 are secured together by suitable bolts extending through bolt holes 16 and 27. The connector base 25 includes a lower annular neck portion 30, which is tapered outwardly toward the bottom thereof and an inner annular seating ridge 31. The ridge 31 is adapted to seat the poppet valve 24 with a suitable seal (not shown) therebetween.

The nozzle assembly 11 includes a nozzle body 32 including an inner sleeve 33 and a hose connection sleeve 34 at opposite ends thereof. The nozzle body 32 is of generally cylindrical configuration, having a radially inwardly extending portion 35, adjacent an adaptor neck seating surface 36, and having a cylindrical bore 37 extending therethrough terminating in an annular radially inwardly directed boss 38.

Three equidistantly peripherally spaced latching slots 40 are provided in the inner sleeve member 33, extending entirely through the wall of the sleeve member 33. Three equidistantly spaced blind bores 41 are positioned in radial alignment with the latching slots 40, extending longitudinally of the nozzle assembly within portion 35 of the adaptor body 32.

The hose connection end 34 of the nozzle body 32 is provided with internal threads 42, adapted to facilitate connection of a hose therewith. A plurality of webs 43 extend radially inwardly from an inner cylindrical surface of the nozzle body 32, terminating in an innner bore 44. A transverse bore 45 is provided across the hose connection end 34 of the nozzle body 32.

Three latching elements 46 are provided within the respective slots 40, extending through the inner sleeve member 33. Each latching element 46 is of greater length than the wall thickness of the sleeve 33, and terminates in a radially inwardly directed protrusion 47, having lower and upper sloped camming surfaces 48, 49. A radial outermost surface 50 of each latching element 46 has a groove 51 extending across the latching element 46, in which is positioned an associated extension spring 52, the terminal ends 53, 54 of which are anchored to associated pins 55, 56 extending longitudinally of the nozzle body 32, across the transverse slot 40 within the wall of the sleeve 33. Camming surfaces 49 facilitate alignment of neck 30 thereagainst.

Each bore 41 houses an associated compression spring 57, a bushing 58, and a retaining pin 60. The retaining pin 60 includes an enlarged end 61, against which abuts one end of the compression spring 57. The retaining pin 60 is thus adapted for limited longitudinal movement within an associated bore 41, upon compression of the spring 57.

An outer annular sleeve member 62 is provided disposed about the outer surface of the inner sleeve member 33, and is adapted for longitudinal movement with respect to the inner sleeve member 33. The outer sleeve member 62 includes an inner cylindrical locking surface 63 and has an annular groove 64 at one end thereof.

A plug sleeve 65 is positioned within the blind bore 37 of the nozzle body 32, and is seated against annular boss 38 with wave washers 66 and spacer 67 therebetween. A suitable seal 68 is provided between the sleeve 65 and the bore 37. A plug assembly 70 is positioned within the nozzle body 32, including a plug valve 71 having a suitable seal 72 provided between its outer surface and the sleeve 65, a longitudinal drive shaft 72 carried within bore 44, and a terminal end of the shaft 73 having a suitable gear-toothed rack 74 adjacent an end thereof.

The assembly 70 also includes a gear 75 carried by a shaft 76 positioned within the bores 45 of the nozzle body 32, the gear 75 being adapted for mating engagements with the gear teeth of the rack 74, and being adapted to longitudinally reciprocate the rack 74 upon rotation of the shaft 76.

The shaft 76 carries a collar 77, outwardly of the nozzle body 32. The collar 77 includes a circular annular portion 78 having a peripheral camming surface 80 thereon, and a flattened portion 81 of the annular portion 78, adapted to permit abutment of an end of the outer locking sleeve 62 thereagainst when the groove 64 at an opposite end of the locking sleeve 62 is in adjacent overlying relation to latching elements 47 within the slots 40 of the inner sleeve 33. A manually operable handle 82 is provided secured to the collar 77, such that, upon rotation of the handle 82, the collar 77 and shaft 76 rotate therewith.

OPERATION

The nozzle assembly 11 is connected to the adaptor assembly 10, by bringing the nozzle assembly 11 into contact with the adaptor assembly 10 in the direction of the vertical arrows in FIGURE 4. During connection of the nozzle and adaptor assemblies, the plug assembly 7 is in a vertically downward position, as is illustrated in FIGURE 4, with the plug valve 71 seated within the sleeve 65 with the seal 72 therebetween. In this position, the locking sleeve 62 is positioned adjacent the flattened portion 81 of the collar 77, with the groove 64 of the collar adjacent the latching elements 48. The latching elements 48 are positioned with their radial outermost portions protruding beyond the outer surface of the inner sleeve member 33, as is illustrated in FIGURE 4. The latching elements are retained in this unlatched position by the associated retaining pins 60, which are positioned in their vertical uppermost position, in engagement with protrusions 47 of the latching elements 46.

As the nozzle assembly is brought into contact with the adaptor assembly, the end surfaces (unnumbered) of the retaining pins 60 are contacted by an undersurface of the adaptor neck 30 of the connecting base 25 of the adaptor assembly 10. Continued movement of the nozzle assembly 11 toward the adaptor assembly 10 causes the neck or rim 30 of the connector base 25 to move the retaining pin 60 vertically downwardly against the force of the compression springs 57, thereby moving the retaining pins 60 to a retracted position, as is shown in FIGURE 6. As the retaining pins 60 approach their fully retracted position, the neck or rim 30 is positioned slightly below the latching elements 46. The camming surfaces 48 of the latching elements 46, are free to move radially inwardly by means of the inward spring force, to a retracted position, in that they are no longer retained outwardly by the retaining pins 60. The latching elements 46 thus move into latching engagement with the projecting rim 30 of the adaptor 10, whereupon camming surfaces 48 are moved radially inwardly in the direction of the double headed arrow of FIGURE 6 to engage surface 29 of the projecting rim 30.

The latching elements 46 are then locked into their latched operative engaging position by movement of the flow handle 82 through its effective pivotal opening stroke in the counterclockwise direction illustrated in FIGURE 1, which rotates the collar 77 such that an edge 79 of the collar 77 contacts the locking sleeve member 62, thereby slidingly moving the locking sleeve 62 vertically upwardly until inner surface 63 of the locking sleeve 62 is in an overlying position to the latching elements 46, positioned radially outwardly of the latching elements 46, such that the latching elements 46 are restrained against radial outward movement by abutment with the surface 63 of the locking sleeve 62. In this position of the locking sleeve 62, the nozzle assembly 11 cannot be disconnected from the adaptor assembly 10, due to the securely locked projecting rim 30 of the adaptor assembly 10, which is prohibited from movement away from the nozzle assembly 11 by the latching elements 46. The latching elements 46 are also prohibited from radial outward movement by the presence of the locking sleeve 62 and the locking sleeve 62 cannot be removed from this position until the handle 82 is returned to the position illustrated in FIGURE 1.

Due to the raising of the locking sleeve 62 to the engaged position illustrated in FIGURE 7, the rotation of the handle 82 rotates the shaft 76 and gear 75 to drive the rack 74 and shaft 73 vertically upwardly, within the bore 44, thereby moving the plug valve 71 upwardly and out of engagement with the sleeve 65. The plug valve 71 is thus moved to the position illustrated in FIGURE 7, into contact with the poppet valve 24, overcoming the compression force of the spring 22, thereby permitting plug valve 71 and poppet valve 24 to move to a vertical upward position adjacent the flow deflection element 17. In this position of the plug assembly 70 and poppet valve 24, fuel supplied from a hose (not shown) through the nozzle assembly 11 is free to flow through the adaptor assembly 10, in the direction of the arrows shown in FIGURE 7.

It is thus readily seen that the flow of fluid through the nozzle assembly 11 is controlled after the locking of the latching elements 46 against disengagement from the projecting rim 30 of the adaptor assembly 10 has been accomplished.

In order to discontinue fluid flow through the nozzle, the reverse of the above-mentioned operational steps is effected. The handle 82 is returned to the position illustrated in FIGURE 1, by a clockwise rotation of the handle, whereby the collar 77 is moved to a position such that the flattened portion 79 is in the position illustrated in FIGURE 1. The locking sleeve 62 is then free to be moved vertically downwardly to a position where the annular groove 64 is in the position overlying the latching elements 46 as illustrated in FIGURE 4. Also, upon return of the handle 82 to the position illustrated in FIGURE 1, the rotating shaft 76 turns the gear 75, which drives the rack vertically downwardly, thereby drawing the plug valve 71 vertically downwardly into seating engagement with the seal 72 of the sleeve 65 within the nozzle body 32. Fluid flow through the nozzle assembly 11 is thus discontinued, and the poppet valve 24 is free to move vertically downwardly into a position of seating engagement with the inner annular ring 31 of the projecting rim 30. The nozzle assembly 11 may then be moved vertically downwardly, during which movement the annular surface 29 of the projecting rim 30 of the adaptor assembly 10 cams the latching elements 46 radially outwardly, by contacting the surfaces 48 thereof. As the latching elements 46 are moved outwardly to a position projecting beyond the outer surface of the inner sleeve member 33, the retaining pins 60 are driven vertically upwardly by the compression springs 57 to a position radially inwardly of and adjacent the surfaces 47 of the latching elements 46, thereby retaining the latching elements 46 locked closed in their outward disengaged position.

It is thus readily seen that accidental disengagement of the nozzle assembly 11 from the adaptor assembly 10 is precluded while the plug valve 71 is in a vertically upward position allowing the passage of fluid thereby. It is also readily seen that fluid loss resulting from accidental disengagement of the nozzle assembly from the adaptor assembly is no longer possible, because the position of the plug valve 71 is operatively related to the position of the locking sleeve 62, which sleeve 62 can only be in an operative position when the rim 30 of the adaptor assembly 10 has moved the retaining pins 60 to a retracted position and permitted the latching elements 46 to engage the projecting rim 30. It is also to be noted that only during operative engagement of the rim 30 by the latching elements 46 may the locking sleeve 62 be moved to a position whereby the plug valve 71 may be opened.

It is also to be understood that compression springs 57, associated with retaining pins 60 dominate respective adjacent springs 52, associated with latching elements 46. In this manner, latching elements 46 are normally retained in a radially outwardly or disengaged position.

While this invention is particularly adapted for use in fueling nozzles and the like, the concepts expressed herein are also adapted for use with other types of valve and connecting assemblies.

I claim:
1. A nozzle connection assembly adapted for engagement with an adaptor neck member, comprising an inner sleeve member, latching means carried by said inner sleeve member in a normally unlatched position, other means carried by said inner sleeve member for retaining said latching means in the normally unlatched position and being adapted by actuation by said adaptor neck member for releasing said latching means to an operative engaging position with said neck member, said latching means including at least one latching element movable transversely of a longitudinal axis of said inner sleeve member within a slot extending through a wall of said inner sleeve member, resilient means for biasing said latching element toward an operative position protruding radially inwardly of said inner sleeve member, and said other means including at least one longitudinally movable pin having resilient means for biasing the pin into contacting engagement with an associated latching element in the unlatched position of said latching element.

2. The assembly of claim 1 wherein said latching element includes a cam surface thereon for contact by an associated pin for moving the latching element from an operative to a closed, unlatched position.

3. The assembly of claim 2 wherein all of said resilient means are spring means.

4. A nozzle connection assembly adapted for engagement with an adaptor neck member, comprising an inner sleeve member, latching means carried by said inner sleeve member in a normally unlatched position, other means carried by said inner sleeve member for retaining said latching means in the normally unlatched position and being adapted by actuation by said adaptor neck member for releasing said latching means to an operative engaging position with said neck member, means for locking said latching means in an operative engaging position, said latching means including three equidistantly circumferentially spaced latching elements movable transversely of a longitudinal axis of said inner sleeve member within a slot extending through a wall of said inner sleeve member; spring means for biasing said latching elements toward an operative position protruding radially inwardly of said sleeve, and said other means including three longitudinally movable pin means, the end surfaces of which are spring biased toward contacting engagement with associated latching element camming surfaces.

5. The assembly of claim 4 wherein said locking means comprises an outer sleeve member slidably positioned about said inner sleeve member having inner surface means for facilitating abutment of said latching means thereagainst when said latching means is in the operative position; said valve positioning means including a camming collar movable upon manual operation of said controlling means into operative engagement with said locking means; said valve comprising a plug assembly; said valve positioning means including a rack operatively connected between said plug assembly and a gear; said gear being rotatably movable upon manual operation of said controlling means.

6. A nozzle connection assembly adapted for engagement with an adaptor neck member, comprising an inner sleeve member, latching means carried by said inner sleeve member in a normally unlatched position and being movable to an operative engaging position with said neck member, means for locking said latching means in an operative engaging position, and single means for controlling the flow of fluid through said assembly and moving said locking means into a locking position with said latching means.

7. The assembly of claim 6 including means carried by said inner sleeve member for retaining said latching means in the normally unlatched position and being adapted by actuation by said adaptor neck member for releasing said latching means to an operative engaging position with said neck member.

8. The assembly of claim 6 wherein said single means operates through a predetermined stroke, said stroke having an initial portion whereupon said locking means is moved into a locking position with said latching means and a final portion whereupon said flow controlling means is actuated, and wherein no actuation of said flow controlling means may take place until the initial portion of said stroke is completed.

9. The assembly of claim 6 wherein said controlling means includes a valve and valve positioning means in operative engagement with said locking means for facilitating movement of said locking means into a disconnected position only when said valve is in a closed position.

10. The assembly of claim 6 wherein said latching means includes at least one latching element movable transversely of a longitudinal axis of said inner sleeve member within a slot extending through a wall of said inner sleeve member.

11. The assembly of claim 10 further including resilient means for biasing said latching element toward an operative position protruding radially inwardly of said inner sleeve member.

12. The assembly of claim 6 wherein said locking means comprises an outer sleeve member slidably positioned about said inner sleeve member having inner surface means for facilitating abutment of said latching means thereagainst when said latching means is in the operative position.

13. The assembly of claim 9 wherein said valve positioning means includes a camming collar movable upon manual operation of said controlling means into operative engagement with said locking means.

14. The assembly of claim 13 wherein said valve comprises a plug assembly; said valve positioning means includes a rack operatively connected between said plug assembly and a gear; and said gear is rotatably movable upon manual operation of said controlling means.

15. The assembly of claim 14 wherein a portion of the periphery of said gear is without teeth, the disposition of said untoothed portion being such that operation of said controlling means to move said camming collar into operative engagement with said locking means will cause said gear to rotate with said untoothed portion passing relative to said rack, and wherein continued operation of said controlling means will cause said gear to engage said rack and thereby actuate said plug assembly.

16. The assembly of claim 6 wherein said latching means includes three equidistantly circumferentially spaced latching elements movable transversely of a longitudinal axis of said inner sleeve member within a slot extending through a wall of said inner sleeve member; and wherein spring means are provided for biasing said latching elements toward an operative position protruding radially inwardly of said sleeve.

References Cited

UNITED STATES PATENTS

| | | | |
|---|---|---|---|
| 2,297,548 | 9/1942 | Fox | 285—316 |
| 2,519,358 | 8/1950 | Davies | 137—614.06 |
| 3,217,747 | 11/1965 | Joanis | 137—614.06 |

FOREIGN PATENTS 465,643  6/1950  Canada.

WILLIAM F. O'DEA, Primary Examiner

HOWARD M. COHN, Assistant Examiner

U.S. Cl. X.R.

137—614.06; 285—85